(12) United States Patent
Alwar et al.

(10) Patent No.: US 12,520,368 B2
(45) Date of Patent: Jan. 6, 2026

(54) APPARATUS, METHOD, AND STORAGE MEDIUM FOR STATE TRANSITION MANAGEMENT IN WIRELESS COMMUNICATION

(71) Applicant: Nokia Technologies Oy, Espoo (FI)

(72) Inventors: Ethiraj Alwar, Bangalore (IN); Amaanat Ali, Espoo (FI); Andres Arjona, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 265 days.

(21) Appl. No.: 17/995,787

(22) PCT Filed: Mar. 5, 2021

(86) PCT No.: PCT/EP2021/055538
§ 371 (c)(1),
(2) Date: Oct. 7, 2022

(87) PCT Pub. No.: WO2021/219280
PCT Pub. Date: Nov. 4, 2021

(65) Prior Publication Data
US 2023/0171839 A1    Jun. 1, 2023

(30) Foreign Application Priority Data

Apr. 28, 2020    (IN) .............................. 202041018209

(51) Int. Cl.
*H04W 76/20*       (2018.01)
*H04W 74/04*       (2009.01)
(Continued)

(52) U.S. Cl.
CPC ........... *H04W 76/20* (2018.02); *H04W 74/04* (2013.01); *H04W 74/0838* (2024.01); *H04W 76/30* (2018.02); *H04W 74/0833* (2013.01)

(58) Field of Classification Search
CPC . H04W 76/20; H04W 74/04; H04W 74/0833; H04W 76/30; H04W 60/04;
(Continued)

(56) References Cited

U.S. PATENT DOCUMENTS

| 2018/0124830 A1* | 5/2018 | Lin ..................... H04W 74/085 |
| 2018/0234941 A1 | 8/2018 | Kim et al. |

(Continued)

FOREIGN PATENT DOCUMENTS

| WO | 2019/061021 A1 | 4/2019 |
| WO | 2019/097110 A1 | 5/2019 |
| WO | 2019/158366 A1 | 8/2019 |

OTHER PUBLICATIONS

"Transmission in preconfigured UL resources", 3GPP TSG RAN WG1 Meeting #96bis, R1-1904168, Agenda: 6.2.1.2, Nokia, Apr. 8-12, 2019, 8 pages.

(Continued)

*Primary Examiner* — Joseph E Avellino
*Assistant Examiner* — Adam Joel Cerlanek
(74) *Attorney, Agent, or Firm* — Carter, DeLuca & Farrell LLP

(57) ABSTRACT

Examples of the present disclosure relates to a user equipment (UE), centralized unit (gNB-CU) of an access node (gNB), a distributed unit (gNB-DU), and an access node for managing the UE's state transition. In an example of the present disclosure there is provided a UE comprising means receiving, from an access node, at least one first message for transitioning the UE from an RRC connected state to an RRC inactive state, wherein the at least one message comprises configuration information that enables the UE to use Contention Free Random Access (CFRA). The UE further comprises means for sending, using CFRA based at least in part on the configuration information, at least one second (Continued)

400

| 401 | Receive configuration information for CFRA |

| 402 | Use CFRA for RRC inactive to RRC connected state transition | message for transitioning the UE from a Radio Resource Control (RRC) inactive state to an RRC connected state.

1 Claim, 5 Drawing Sheets

(51) Int. Cl.
*H04W 74/0833* (2024.01)
*H04W 74/0838* (2024.01)
*H04W 76/30* (2018.01)

(58) Field of Classification Search
CPC .. H04W 68/005; H04W 88/085; H04W 76/27
See application file for complete search history.

(56) References Cited

U.S. PATENT DOCUMENTS

| | | | |
|---|---|---|---|
| 2018/0270791 A1* | 9/2018 | Park | H04W 68/04 |
| 2019/0021058 A1* | 1/2019 | Cheng | H04W 72/23 |
| 2019/0053120 A1 | 2/2019 | Park et al. | |
| 2019/0174402 A1* | 6/2019 | Zhao | H04W 76/27 |
| 2020/0229265 A1* | 7/2020 | Wang | H04W 24/08 |
| 2021/0051736 A1* | 2/2021 | Jeon | H04W 76/11 |
| 2021/0259040 A1* | 8/2021 | Babaei | H04W 72/23 |

OTHER PUBLICATIONS

"Support for transmission in preconfigured UL resources in LTE-MTC", 3GPP TSG-RAN WG1 Meeting #96bis, R1-1903883, Agenda: 6.2.1.2, Ericsson, Apr. 8-12, 2019, pp. 1-16.

Kim et al., "RAPID: Contention Resolution-based Random Access using Context ID for IoT", IEEE Transactions on Vehicular Technology, vol. 68, No. 7, Jul. 2019, pp. 7121-7135.

"Inactive to connected state transition", 3GPP TSG RAN WG3 Meeting #97b, R3-174780, Agenda: 10.10.1.5, Ericsson, Nov. 27-Dec. 1, 2017, pp. 1-4.

"TP on solutions for RACH optimisation", 3GPP TSG-RAN WG3 #104, R3-193063, Agenda: 25.2.3.3, Ericsson, May 13-17, 2019, pp. 1-3.

"3rd Generation Partnership Project; Technical Specification Group Radio Access Network; NG-RAN; F1 application protocol (F1AP) (Release 15)", 3GPP TS 38.473, V15.9.0, Mar. 2020, pp. 1-222.

"3rd Generation Partnership Project; Technical Specification Group Radio Access Network; NR; Radio Resource Control (RRC) protocol specification (Release 15)", 3GPP TS 38.331, V15.9.0, Mar. 2020, pp. 1-536.

International Search Report and Written Opinion received for corresponding Patent Cooperation Treaty Application No. PCT/EP2021/055538, dated Jun. 1, 2021, 14 pages.

"Random Access Procedure for RRC Inactive State", 3GPP TSG-RAN2 101bis, R2-1804314, Agenda: 10.4.1.7.3, Samsung, Apr. 16-20, 2018 , 3 pages.

Office Action received for corresponding Chinese Patent Application No. 202180031272.6, dated Nov. 14, 2024, 6 pages of Office Action and no page of translation available.

Office Action received for corresponding European Patent Application No. 21710440.5, dated Jan. 3, 2025, 8 pages.

Office Action received for corresponding Chinese Patent Application No. 202180031272.6, dated Apr. 9, 2025, 5 pages of office action and no page of translation available.

Office action received for corresponding Chinese Patent Application No. 202180031272.6, dated Jun. 19, 2025, 7 pages of office action and no page of translation available.

* cited by examiner

APPARATUS, METHOD, AND STORAGE MEDIUM FOR STATE TRANSITION MANAGEMENT IN WIRELESS COMMUNICATION

RELATED APPLICATION

This application was originally filed as PCT Application No. PCT/EP2021/055538, filed on Mar. 5, 2021, which claims priority from Indian Provisional Application No. 202041018209, filed on Apr. 28, 2020, each of which is incorporated herein by reference in its entirety.

TECHNOLOGICAL FIELD

Examples of the present disclosure relate to state transition management in wireless communication. Some examples relate to state transition within a CM-CONNECTED connection management state. Some examples relate to RRC_INACTIVE to RRC_CONNECTED state transition of a CM-CONNECTED state of a $5^{th}$ Generation (5G) New Radio (NR) User Equipment (UE).

BACKGROUND

A 5G NR UE can have two Connection Management (CM) states: CM-IDLE and CM-CONNECTED. RRC state RRC_IDLE belongs to the CM-IDLE state. RRC state RRC_CONNECTED belongs to the CM-CONNECTED state. 5G NR introduced a further RRC state: RRC_INACTIVE also belonging to the CM-CONNECTED state.

A UE can remain in the CM-CONNECTED state and transition between the RRC_INACTIVE state and RRC_CONNECTED state. When the UE is in the RRC_INACTIVE state and needs to transmit/receive user data, it can transition to the RRC_CONNECTED.

In some circumstances it may be desirable to provide improved state transition management. In some circumstances it may be desirable to reduce network signalling load as well as to reduce latency involved in transitioning from one state to another, such as a UE transitioning between RRC_INACTIVE and RRC_CONNECTED states.

BRIEF SUMMARY

According to various, but not necessarily all, examples of the present disclosure there is provided a User Equipment (UE), comprising means for performing:
  receiving, from an access node, at least one first message for transitioning the UE from an RRC connected state to an RRC inactive state, wherein the at least one message comprises configuration information that enables the UE to use Contention Free Random Access (CFRA); and
  sending, using CFRA based at least in part on the configuration information, at least one second message for transitioning the UE from a Radio Resource Control (RRC) inactive state to an RRC connected state.

According to various, but not necessarily all, examples of the present disclosure there is provided a centralized unit (gNB-CU) of an access node (gNB) for use in a disaggregated architecture comprising at least the centralized unit (gNB-CU) and a distributed unit (gNB-DU), the centralized unit (gNB-CU) comprising means for performing:
  receiving, from the distributed unit (gNB-DU), configuration information that enables a UE to use Contention Free Random Access (CFRA); and
  causing sending, to the UE, of at least one message for transitioning the UE from a Radio Resource Control (RRC) connected state to an RRC inactive state, wherein the at least one message comprises the configuration information.

According to various, but not necessarily all, examples of the present disclosure there is provided a distributed unit (gNB-DU) of an access node (gNB) for use in a disaggregated architecture comprising at least the distributed unit (gNB-DU) and a centralized unit (gNB-CU), the distributed unit (gNB-DU) comprising means for performing:
  sending, to the centralized unit (gNB-CU), configuration information that enables a UE to use Contention Free Random Access (CFRA);
  receiving, from the centralized unit (gNB-CU), at least one message for transitioning the UE from a Radio Resource Control (RRC) connected state to an RRC inactive state, wherein the at least one message comprises the configuration information; and
  sending the at least one message to the UE.

According to various, but not necessarily all, examples of the present disclosure there is provided an access node (gNB), comprising means for performing:
  sending, to a UE, at least one message for transitioning the UE from a Radio Resource Control (RRC) connected state to an RRC inactive state, wherein the at least one message comprises configuration information that enables the UE to use Contention Free Random Access (CFRA).

According to various, but not necessarily all, examples of the present disclosure there is provided a system comprising: at least the UE as mentioned above; and at least one access node as mentioned above.

According to various, but not necessarily all, examples of the present disclosure there is provided a method comprising:
  receiving, from an access node, at least one first message for transitioning the UE from an RRC connected state to an RRC inactive state, wherein the at least one message comprises configuration information that enables the UE to use Contention Free Random Access (CFRA); and
  sending, using CFRA based at least in part on the configuration information, at least one second message for transitioning the UE from a Radio Resource Control (RRC) inactive state to an RRC connected state.

According to various, but not necessarily all, examples of the present disclosure there is provided a method comprising:
  receiving, from a distributed unit (gNB-DU) of an access node (gNB), configuration information that enables a UE to use Contention Free Random Access (CFRA); and
  causing sending, to the UE, of at least one message for transitioning the UE from a Radio Resource Control (RRC) connected state to an RRC inactive state, wherein the at least one message comprises the configuration information.

According to various, but not necessarily all, examples of the present disclosure there is provided a method comprising:
  sending, to a centralized unit (gNB-CU) of an access node (gNB), configuration information that enables a UE to use Contention Free Random Access (CFRA);
  receiving, from the centralized unit (gNB-CU), at least one message for transitioning the UE from a Radio Resource Control (RRC) connected state to an RRC inactive state, wherein the at least one message comprises the configuration information; and sending the at least one message to the UE.

According to various, but not necessarily all, examples of the present disclosure there is provided a method comprising:

sending, to a UE, at least one message for transitioning the UE from a Radio Resource Control (RRC) connected state to an RRC inactive state, wherein the at least one message comprises configuration information that enables the UE to use Contention Free Random Access (CFRA).

According to various, but not necessarily all, examples of the present disclosure there is provided a computer program that, when run on a computer of a UE, causes at least the following to be performed:

receiving, at a User Equipment (UE) from an access node, at least one first message for transitioning the UE from an RRC connected state to an RRC inactive state, wherein the at least one message comprises configuration information that enables the UE to use Contention Free Random Access (CFRA); and sending, using CFRA based at least in part on the configuration information, at least one second message for transitioning the UE from a Radio Resource Control (RRC) inactive state to an RRC connected state.

According to various, but not necessarily all, examples of the present disclosure there is provided a computer program that, when run on a computer of a gNB-CU, causes at least the following to be performed:

receiving, from a distributed unit (gNB-DU) of an access node (gNB), configuration information that enables a UE to use Contention Free Random Access (CFRA); and causing sending, to the UE, of at least one message for transitioning the UE from a Radio Resource Control (RRC) connected state to an RRC inactive state, wherein the at least one message comprises the configuration information.

According to various, but not necessarily all, examples of the present disclosure there is provided a computer program that, when run on a computer of a gNB-DU, causes at least the following to be performed:

sending, to a centralized unit (gNB-CU) of an access node (gNB), configuration information that enables a UE to use Contention Free Random Access (CFRA);

receiving, from the centralized unit (gNB-CU), at least one message for transitioning the UE from a Radio Resource Control (RRC) connected state to an RRC inactive state, wherein the at least one message comprises the configuration information; and sending the at least one message to the UE.

According to various, but not necessarily all, examples of the present disclosure there is provided a computer program that, when run on a computer of a gNB, causes at least the following to be performed:

sending, to a UE, at least one message for transitioning the UE from a Radio Resource Control (RRC) connected state to an RRC inactive state, wherein the at least one message comprises configuration information that enables the UE to use Contention Free Random Access (CFRA).

According to various, but not necessarily all, embodiments there is provided examples as claimed in the appended claims.

While the above examples and options of the disclosure are described separately, it is to be understood that their provision in all possible combinations and permutations is contained within the disclosure.

BRIEF DESCRIPTION

Some examples will now be described with reference to the accompanying drawings in which.

Figure 1:
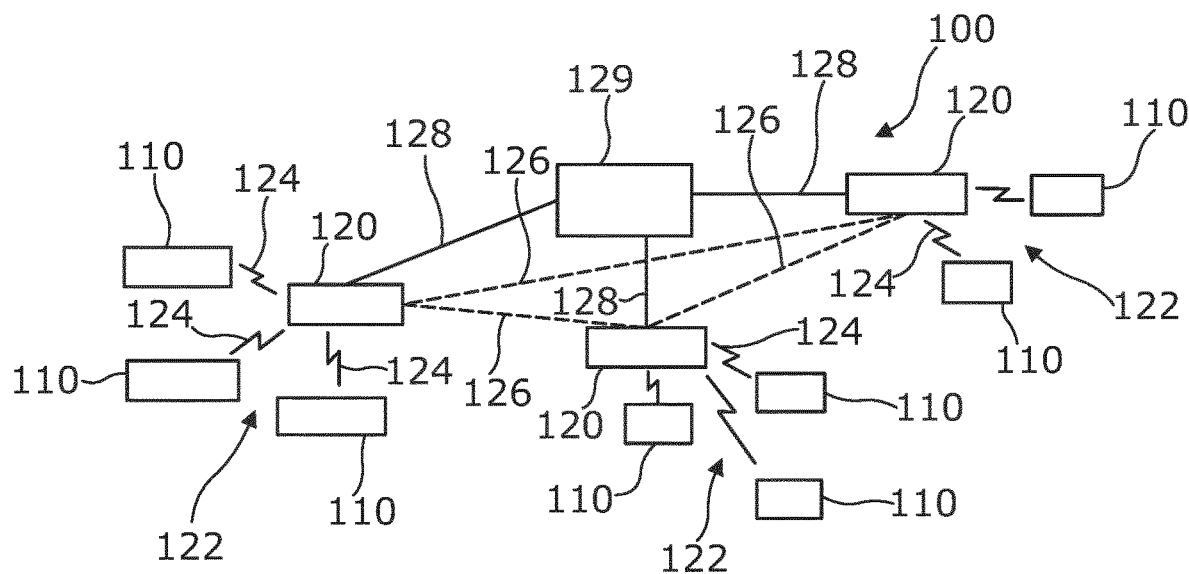
FIG. 1 shows an example of the subject matter described herein.

The figures are not necessarily to scale. Certain features and views of the figures may be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

LIST OF ABBREVIATIONS

3GPP Third Generation Partnership Project
5G $5^{th}$ Generation
AMF Access and Mobility management Function
CBRA Contention Based Random Access
CFRA Contention Free Random Access
CM Connection Management
gNB gNodeB
gNB-CU gNodeB Centralized Unit
gNB-DU gNodeB Distributed Unit
IE Information Element
MAC Medium Access Control
NG Next Generation
NR New Radio/Next Radio
PRACH Physical Random Access CHannel
RA Random Access
RACH Random Access CHannel
RAN Radio Access Network
RLC Radio Link Control
RNA Radio Access Network Based Notification Area
RNAU Radio Access Network Based Notification Area Update
RRC Radio Resource Control
URLLC Ultra Reliable Low Latency Communications
UE User Equipment

DETAILED DESCRIPTION

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a Third Generation Partnership Project (3GPP) network in which the terminal nodes 110 are user equipment (UE) and the access nodes 120 are base stations.

In the particular example illustrated, the network 100 is a Next Generation (NG), or New Radio (NR), Radio Access Network (RAN)—i.e. NG-RAN or NR-RAN. New Radio is the 3GPP name for 5G technology. In the 5G System (5GS), the NG-RAN consist of gNodeBs (gNBs) 120, providing the user plane and control plane Radio Resource Control (RRC) protocol terminations towards the UE 110. The gNBs 120 are interconnected with each other by means of an X2/Xn interface 126. The gNBs are also connected by means of the N2 interface 128 to the Access and Mobility management Function (AMF) 130.

Figure 2:
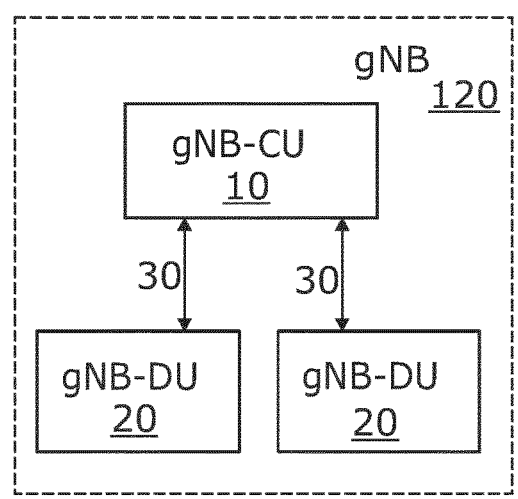
FIG. 2 shows another example of the subject matter described herein.

FIG. 2 illustrates an example of an access node 120 (e.g. gNB). In this example, the access node has a disaggregated (split) architecture. The gNB 120 comprises one or more distributed units (gNB-DU) 20 and a centralized unit (gNB-CU) 10.

The gNB-CU 10 is a logical node configured to host a Radio Resource Connection layer (RRC) and other layers of the gNB 120. The gNB-CU 10 controls the operation of one or more gNB-DUs 20. The gNB-DU 20 is a logical node configured to host Radio Link Control Protocol layer (RLC), Medium Access Control layer (MAC) and Physical layer (PHY) of the access node (gNB) 120. The gNB-DU 20 communicates via a dedicated interface (F1) to the RRC layer hosted by the gNB-CU.

One gNB-DU 20 can support one or multiple cells 122 (not illustrated in the figure). One cell is supported by only one gNB-DU 20.

The gNB-CU 10 and a gNB-DU 20 communicate via a dedicated interface 30, the F1 interface. The interface 30 connects a Radio Resource Connection layer (RRC) hosted by the gNB-CU 10 to the different, lower layers hosted by the gNB-DU 20. The F1 interface functions are divided into F1-Control Plane Function (F1-C) and F1-User Plane Function (F1-U).

Figure 3:
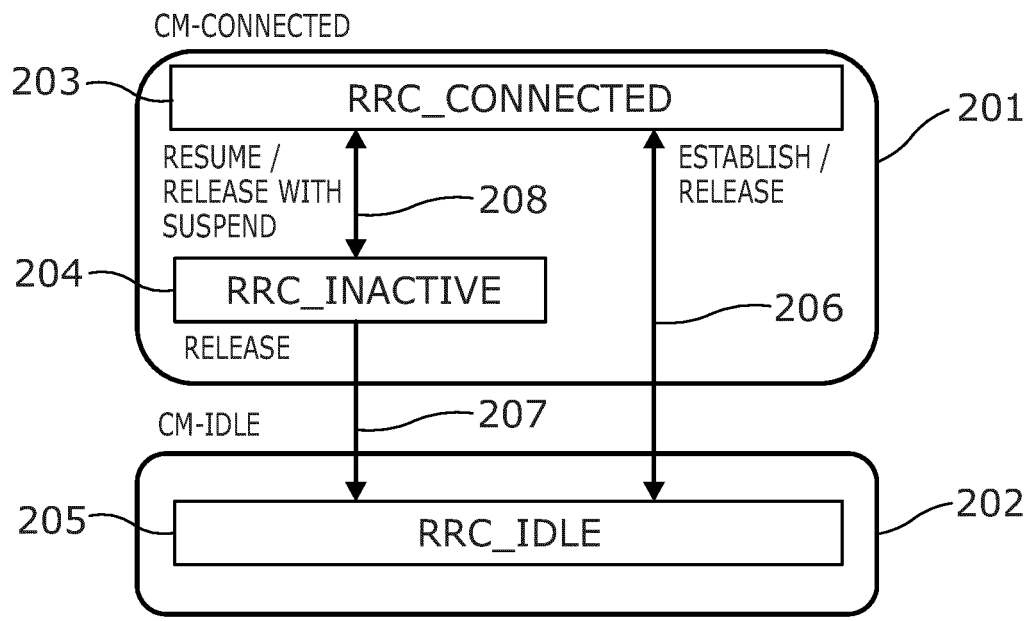
FIG. 3 shows another example of the subject matter described herein.

FIG. 3 illustrates examples of various possible states 201-205 and state transitions 206-208 of a UE of a 5GS. The UE can have two Connection Management (CM) states:
  i) a connected connection management state 201, CM-CONNECTED, and
  ii) an idle connection management state 202, CM-IDLE.

The idle connection management state 202 has the following RRC state:
  an idle RRC state 205, RRC_IDLE.

The connected connection management state 201 has the following Radio Resource Control (RRC) states:
  i) a connected RRC state 203, RRC_CONNECTED, and
  ii) an inactive RRC state 204, RRC_INACTIVE.

The RRC_INACTIVE state acts as a "dormant"/low power state of the CM-CONNECTED state. Since, in the RRC_INACTIVE state, both the UE and its serving access node (gNB) keep necessary configurations and information exchanged, the UE can readily transition from the RRC_INACTIVE state to the RRC_CONNECTED state when data needs to be transmitted/received.

A UE can remain in the CM-CONNECTED state and transition between the RRC_INACTIVE state and RRC_CONNECTED state. When the UE is in the RRC_INACTIVE state and needs to transmit/receive data, it can transition to the RRC_CONNECTED. There is an inherent benefit of having the UE keep a CM-CONNECTED state even when there is no data being transmitted, as both the UE and gNB keep necessary configurations and information exchanged. This can reduce signalling towards core network significantly (and hence also save UE power), as well as allow the UE to have very little delay incurred when it needs to transmit/receive data, thereby reducing latency.

RRC messages are used to initiate RRC state transitions.

An RRC establish message can be used to transition the UE from RRC_IDLE to RRC_CONNECTED (illustrated via the arrow 206 in the upward direction). An RRC release message can be used to transition the UE from RRC_CONNECTED to RRC_IDLE (illustrated via the arrow 206 in the downward direction).

An RRC release Message can be used to transition the UE from RRC_INACTIVE to RRC_IDLE (illustrated via the arrow 207).

An RRC resume message can transition the UE from RRC_INACTIVE to RRC_CONNECTED (illustrated via the arrow 208 in the upward direction). An RRC release with suspend message can transition the UE from RRC_CONNECTED to RRC_INACTIVE (illustrated via the arrow 208 in the downward direction).

When transitioning from RRC_CONNECTED to RRC_INACTIVE state, the network (e.g. gNB network node) provides the necessary configuration information to be used when resuming the connection, i.e. to be used when transitioning back to RRC_CONNECTED. Such necessary configuration information is provided in a SuspendConfig Information Element (IE) in an RRCRelease message from the network (e.g. gNB) to the UE.

However, in accordance with current 3GPP specifications, the presently existing conventional SuspendConfig IE provided to a UE does not have the capability to send dedicated preambles to the UE, i.e. so as to enable the network (e.g. gNB) to allocate a dedicated resource for the UE to perform uplink access (for example one or more cell specific Random Access CHannel (RACH) dedicated configuration preambles to enable the UE to use Contention Free Random Access (CFRA) in sending a RRC resume message).

Current conventional 3GPP specifications mandate UEs to use Contention Based Random Access (CBRA) during RRC_INACTIVE to RRC_CONNECTED state transitions. The inventors of the present invention have appreciated that this may give rise to delays and latency as well as issues for example for UEs requiring high priority access (i.e. UEs for high priority users and/or UEs providing high priority services, e.g. not least such as emergency services and Ultra Reliable Low Latency Communication (URLLC)). Such UEs, when making such a state transition using CBRA, would have to compete for air interface resources with other UEs, e.g. low priority UEs whose users/services are of lower priority. Issues that may arise are, for instance, Random Access (RA) failure, due to non-availability of preambles, which may result in re-attempts and hence increase latency.

Currently, there is no provision in the 3GPP specification for 5G NR to allow use of CFRA during RRC_INACTIVE to RRC_CONNECTED state transitions.

Certain examples of the present disclosure seek to enable a UE to use CFRA during RRC_INACTIVE to RRC_CONNECTED state transitions which may give rise to the technical benefit of reduced latency.

Figure 4:
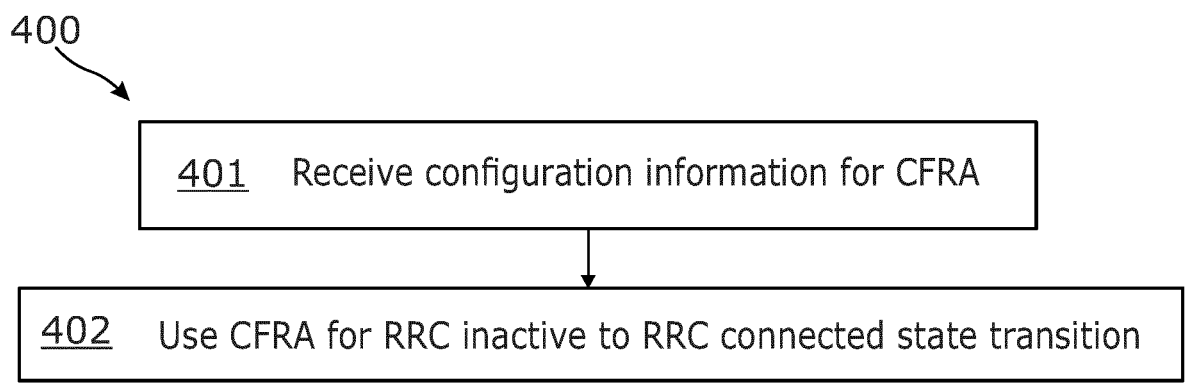
FIG. 4 shows another example of the subject matter described herein.

FIG. 4 illustrates an example of a method 400 that can be performed by a UE 110 according to the present disclosure.

In block 401, the UE receives configuration information that enables the UE to use Contention Free Random Access (CFRA). The configuration information can be comprised in, and/or encoded in, a message for transitioning the UE from an RRC connected state to an RRC inactive state In some examples, the UE 110 receives, when in the RRC_CONNECTED state, the configuration information from an access node 120.

In some examples, the configuration information is comprised in, and/or encoded in, an RRC message, such as an RRC release message (e.g. RRCRelease). Such an RRC release message can be for transitioning the UE from an RRC connected state (RRC_CONNECTED) to an RRC inactive state (RRC_INACTIVE). Such an RRC release message may comprise suspend configuration information, i.e. a Suspend Configuration IE of the RRC release message (e.g. RRCRelease with SuspendConfig). In some examples, the configuration information is comprised in, and/or encoded in a paging message, such as a Paging message in RRC protocol. In this regard, the configuration information can be provided during Paging. Providing the configuration information during paging would advantageously provide the benefit at the access node 120 in that, based on the type of information being received from core node 129, the access node could dynamically decide whether to allocate a resource such as a dedicated preamble (that, as discussed below, an indication of which may be comprised in the configuration information that enables the UE to use CFRA) for the state change of the UE being triggered with paging.

In some examples, the configuration information is indicative of a CFRA resource allocation. In some examples, the CFRA resource is allocated per cell, or for each Synchronization Signal Block (SSB) of the cell. In some examples, the configuration information is indicative of one or more dedicated resources, such as a preconfigured uplink resource, for the UE to perform uplink access.

A Physical Random Access Channel (PRACH) Preamble is a resource that is used by the UE to initiate a Random Access Procedure. A Preamble is a specific pattern and this specific pattern is called a "Signature". In some examples, the configuration information is indicative of one or more configured dedicated preambles, such as contention free preambles. In some examples, the configuration information is indicative of one or more cell specific RACH dedicated configuration preambles. In some examples, the configuration information is a Dedicated Preamble as part of a Dedicated Random Access Configuration. In some examples, the configuration information is indicative of one or more of the aforesaid items.

In block 402, the UE sends, to the access node 120, using CFRA based at least in part on the configuration information, at least one message for transitioning the UE from a Radio Resource Control (RRC) inactive state to an RRC connected state. In some examples the at least one message includes the PRACH preamble.

In some examples, the UE initiates an RRC resume procedure. In some examples, the at least one message of block 402 is at least one message of the RRC resume procedure. In some examples, the UE sends, when in the RRC_INACTICE state and using CFRA based on the received configuration information, a RRC Resume Request message to the access node.

In some examples, for a UE initiated RRC resume procedure (e.g. to send Uplink data or an RNA update), in order for the UE to communicate with the access node, it executes a RACH procedure. In order for the UE to use Contention Free preambles in its RACH request, it needs to have received CFRA dedicated preambles beforehand, e.g. such as in the configuration information received in block 401. In some examples, the UE utilizes the received configuration information, e.g. the Contention Free preambles comprised in the configuration information, and carries out a CFRA procedure when contacting the network. After network has been contacted in this manner, the RRC Resume Request message is sent to the access node. The CFRA method allows the UE to be able to contact the network without any collisions with other users.

In some examples, the configuration information relates to a CFRA allocation, and the UE releases the CFRA allocation in response to determining that a condition being met, such as not least for example determining that a predefined time period has elapsed. Such a time period may be set by the access node and provided to the UE.

In some examples of block 402 (as is discussed further below with respect to procedure (C) of FIG. 7, in case the UE triggers a Radio Access Network Based Notification Area Update (RNAU) procedure according to the movement of the UE, the UE performs CBRA to transit from the RRC inactive state to the RRC connected state instead of CFRA.

Figure 5:
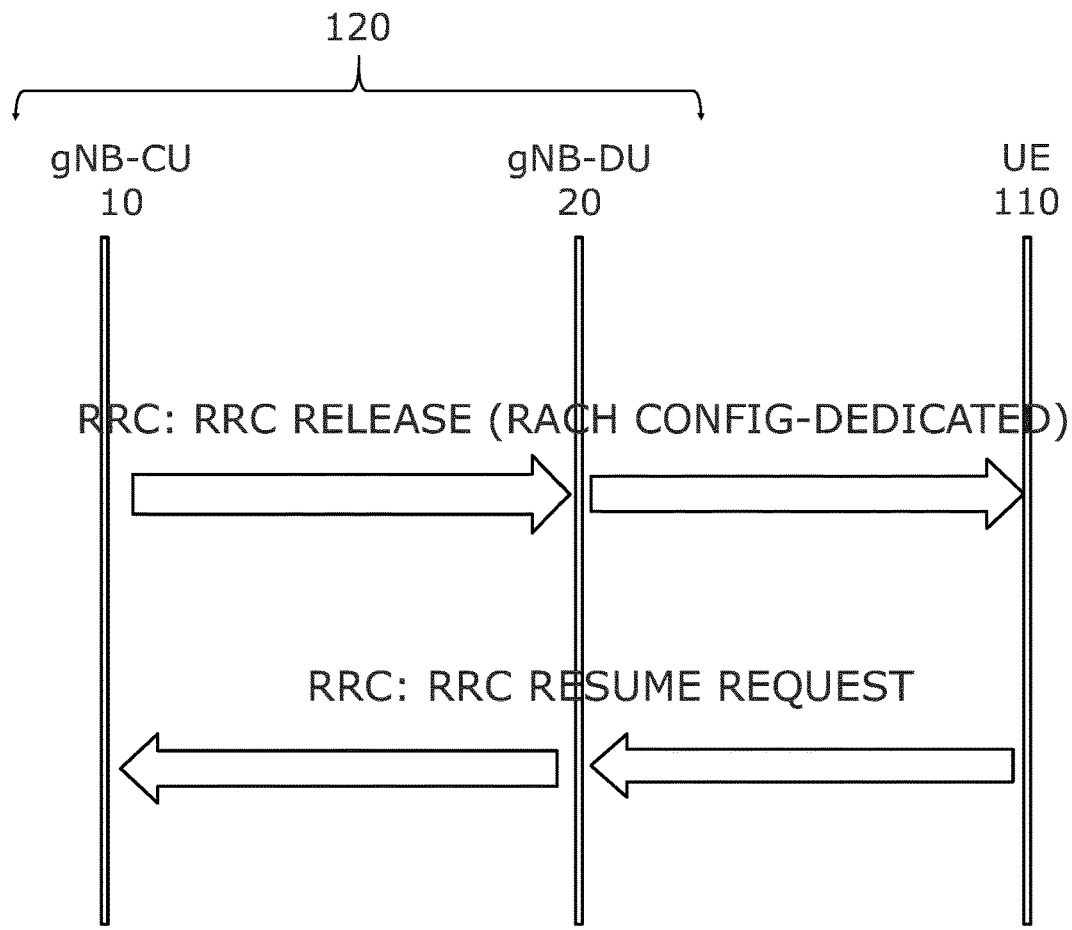
FIG. 5 shows another example of the subject matter described herein.

FIG. 5 illustrates an example of signaling that can be performed between a centralized unit 10 (gNB-CU) of an access node 120 (gNB), a distributed unit 20 (gNB-DU) of the access node 120, and a UE 110 according to the present disclosure.

In this example, the access node (gNB) has a disaggregated architecture comprising at least the centralized unit (gNB-CU) and at least one distributed unit (gNB-DU).

The gNB-CU sends, via the gNB-DU, to the UE (when the UE is in an RRC_CONNECTED state), at least one message for transitioning the UE from a Radio Resource Control (RRC) connected state to an RRC inactive state, wherein the at least one message comprises configuration information that enables the UE to use Contention Free Random Access (CFRA) with the gNB-DU. In some examples, the gNB-CU sends, via the gNB-DU, an RRC release message comprising RACH dedicated configuration/RACH preambles for enabling the UE to use CFRA to the gNB-DU. Such an RRC release message comprising RACH dedicated configuration/RACH preambles for enabling the UE to use CFRA is referred to herein as: RRC RELEASE (RACH CONFIG-DEDICATED), i.e. the gNB-CU sends, via the gNB-DU, RRC RELEASE (RACH CONFIG-DEDICATED) to the UE.

Following receipt of RRC RELEASE (RACH CONFIG-DEDICATED), the UE transitions from the RRC_CONNECTED state to the RRC_INACTIVE state.

At a later point in time, e.g. when the UE subsequently initiates an RRC Resume process in order to transmit/receive user data, the UE sends to the gNB-DU a RRC Resume request message (RRC RESUME REQUEST) using CFRA based on the previously received configuration information.

Figure 6:
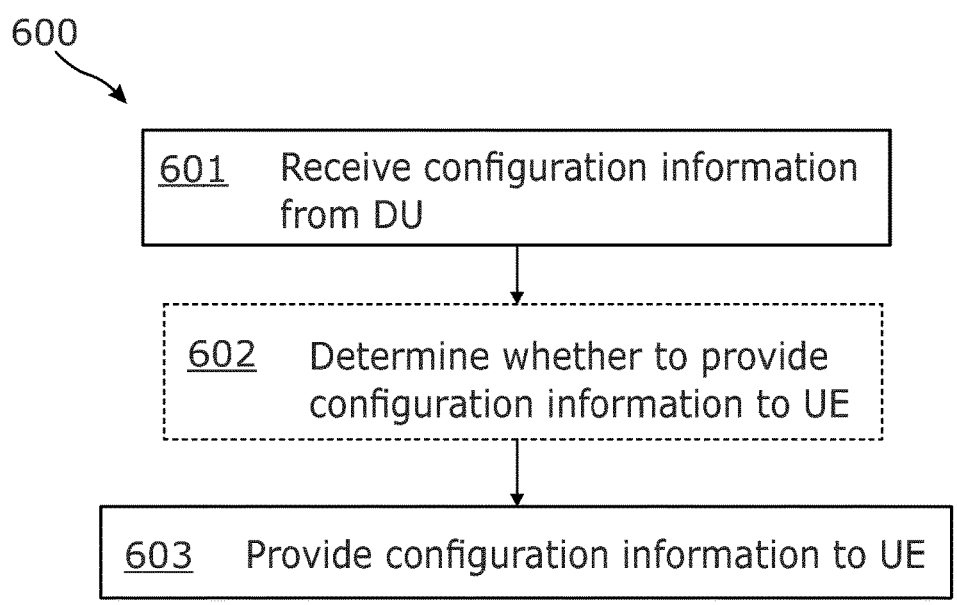
FIG. 6 shows another example of the subject matter described herein.

FIG. 6 illustrates an example of a method 600 that can be performed by a gNB-CU 10 of a gNB 120 according to the present disclosure.

In block 601, the gNB-CU receives, from a gNB-DU 20, configuration information for enabling a UE to use Contention Free Random Access (CFRA), e.g. RACH CONFIG DEDICATED.

In some examples, the configuration information is generated by a gNB-DU 20 of the gNB 120, and the configuration information is received by the gNB-CU 10 from the gNB-DU 20. The configuration information, e.g. preambles/dedicated PRACH signatures, may be known to the lower layers which would be in position to decide which dedicated PRACH signatures can be utilized in a given cell.

In optional block 602, the gNB-CU determines whether or not to provide the configuration information to the UE. In some examples, such determination is based, at least in part, on whether at least one condition/criterion has been met. The at least one condition/criterion can be pre-determined and/or configurable by a service operator. In some examples, the at least one condition/criterion is based, at least in part, on at least one from the group of:

- a type of the UE's subscription (e.g. not least: public safety, law enforcement, non-public network. For example, the gNB-CU may enable the UE to be provided with the configuration information for CFRA based on whether the UE is subscribed to a particular service, e.g. a new service offered by the operator);
- a type of the UE (e.g. not least: predefined UE model(s), whether it is a wireless router/modem, smartphone, or machine-type-communication receiver, or sensor, etc. For example, the gNB-CU may enable the UE to be provided with the configuration information for CFRA based on whether the UE is a particular type, category or class of UE. The operator may set/specify which types/categories of UE CFRA would be enabled);
- a type of service (e.g. not least: emergency, voice call, emergency signaling, public safety, non-public networks (NPN) services); and
- a network slice (e.g. not least: URLLC, vehicle communications. For example, the gNB-CU may enable the UE to be provided with the configuration information for CFRA based on whether the UE is assigned to a particular network slice. In some examples, the gNB assigns a network slice during an RRC Idle to RRC Connected state transition. CFRA is provides/enabled for UE's assigned to the network slice. A network slice can be a logical network that provides specific network capabilities and network characteristics, and a network slice instance can be: a set of network function instances and the required resources (e.g. computational, storage and networking resources) which form a deployed network slice).

In such a manner, a prioritization of UE's may occur, i.e. UE's deemed to be high priority (e.g. based on their use by an emergency service, or due to them providing URLLC) may be provided with the configuration information enabling CFRA access for initiating the RRC Resume process, thereby reducing latency (as compared to other UE's for whom the condition/criterion are not satisfied which are deemed low/lower priority and are not provided the configuration information for CFRA and instead rely on CBRA).

In block 603, the gNB-CU causes the sending of the at least one message comprising the configuration information, i.e. sending via the gNB-DU. Where block 602 is implemented, the performance of block 603 is based, at least in part, on the determination that the at least one condition has been met, In some examples, the configuration information sent to the UE is comprised in, and/or encoded in, a Suspend Configuration IE of an RRC release message (e.g. RRCRelease with SuspendConfig) for transitioning the UE from an RRC connected state (RRC_CONNECTED) to an RRC inactive state (RRC_INACTIVE). In some examples, the configuration information is indicative of one or more cell specific, i.e. gNB-DU specific, RACH dedicated configuration preambles for enabling the UE CFRA to the specific gNB-DU.

In some examples, the configuration information sent to the UE is comprised in, and/or encoded in a paging message, such as a Paging message in RRC protocol. In this regard, the configuration information can be provided during Paging.

Figure 7:
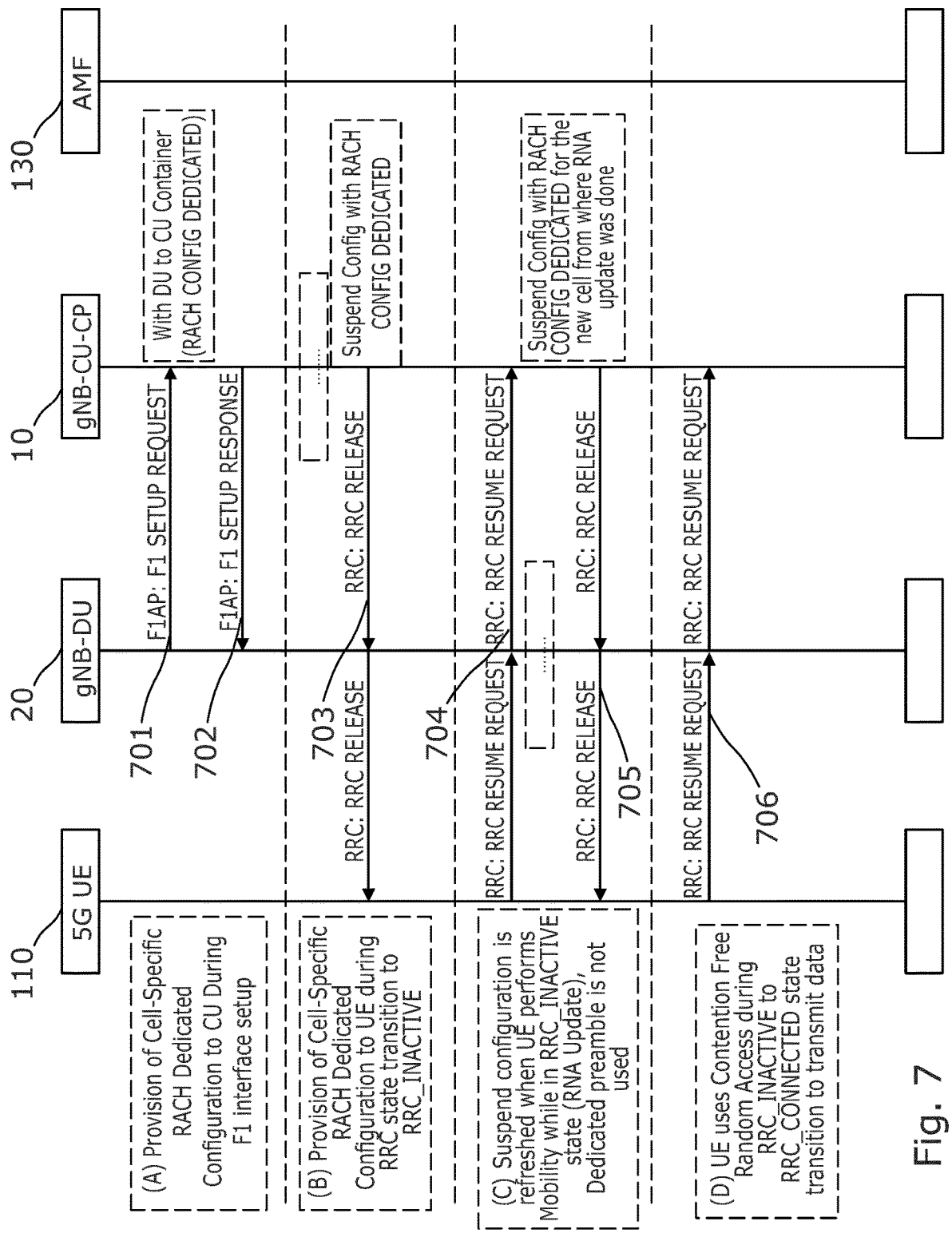
FIG. 7 shows another example of the subject matter described herein.

FIG. 7 illustrates an example of signaling that can be performed in a 5GS according to the present disclosure. The 5GS comprises: an AMF 130, gNB-CU 10, gNB-DU 20 and UE 110.

In task (A), the gNB-DU provides, to the gNB-CU, configuration information for enabling a UE to use CFRA with the gNB-DU, namely RACH Dedicated Configuration comprising a dedicated preamble, which may be Cell-Specific. This can be provided in an RRC Container having a RACH-ConfigDedicated IE. This can be provided via an RRC container for each serving cell. The RACH-ConfigDedicated IE may comprise a Dedicated Preamble as part of a Dedicated Random Access Configuration (wherein the Dedicated Random Access Configuration is to be used by the UE when the UE performs Random Access using the preambles when it sends a RRC resume request message to transition from RRC_INACTIVE to RRC_CONNECTED states).

In some examples, the Cell-Specific RACH Dedicated Configuration is provided during an F1 Interface Setup using F1AP messages, e.g. as part of an F1 SETUP REQUEST message 701 sent from the gNB-DU to the gNB-CU. Responsive to the F1 SETUP REQUEST, the gNB-CU may send to the gNB-DU F1 SETUP RESPONSE message 702. In such a manner, messages 701 and 702 thereby provide a mechanism for coordinating the resource allocation over the F1 interface between the gNB-CU and the gNB-DU.

In this regard, in accordance with the present disclosure, it is proposed that a new "Cell-Specific-RACH Config Dedicated" IE be introduced in the Served Cell Information" as indicated in the highlighted "Cell-Specific-RACH Config Dedicated" below Served Cell Information [which is based on: 3rd Generation Partnership Project; Technical Specification Group Radio Access Network; NG-RAN; F1 application protocol (F1AP); (Release 15)—3GPP TS 38.473 V15.9.0 (2020-03)]. The following Cell-Specific-RACH Config Dedicated IE is just one possible example and the other IE's or messages could be used to transmit the configuration information.

9.3.1.10 Served Cell Information

This IE contains cell configuration information of a cell in the gNB-DU.

| IE/Group Name | Presence | Range | IE type and reference | Semantics description | Criticality | Assigned Criticality |
|---|---|---|---|---|---|---|
| NR CGI | M | | 9.3.1.12 | | — | |
| NR PCI | M | | INTEGER (0 ... 1007) | Physical Cell ID | — | |
| 5GS TAC | O | | 9.3.1.29 | 5GS Tracking Area Code | — | |
| Configured EPS TAC | O | | 9.3.1.29a | | | |
| Served PLMNs | | 1 ... <maxnoofBPLMNs> | | Broadcast PLMNs | — | |
| >PLMN Identity | M | | 9.3.1.14 | | | |
| >TAI Slice Support List | O | | Slice Support List 9.3.1.37 | Supported S-NSSAIs per TA. | YES | ignore |
| CHOICE NR-Mode-Info | M | | | | — | |
| >FDD | | | | | — | |
| >>FDD Info | | 1 | | | — | |
| >>>UL FreqInfo | M | | NR Frequency Info 9.3.1.17 | | — | |
| >>>DL FreqInfo | M | | NR Frequency Info 9.3.1.17 | | — | |
| >>>UL Transmission Bandwidth | M | | Transmission Bandwidth 9.3.1.15 | | — | |
| >>>DL Transmission Bandwidth | M | | Transmission Bandwidth 9.3.1.15 | | — | |
| >TDD | | | | | — | |
| >>TDD Info | | 1 | | | — | |
| >>>NR FreqInfo | M | | NR Frequency Info 9.3.1.17 | | — | |
| >>>Transmission Bandwidth | M | | Transmission Bandwidth 9.3.1.15 | | — | |
| Measurement Timing Configuration | M | | OCTET STRING | Contains the MeasurementTiming Configuration inter-node message defined in TS 38.331 [8]. | — | |
| RANAC | O | | RAN Area Code 9.3.1.57 | | YES | ignore |
| Extended Served PLMNs List | | 0 ... 1 | | This is included if more than 6 Served PLMNs is to be signalled. | YES | ignore |
| >Extended Served PLMNs Item | | 1 ... <maxnoofExtended BPLMNs> | | | — | |
| >>PLMN Identity | M | | 9.3.1.14 | | — | |
| >>TAI Slice Support List | O | | Slice Support List 9.3.1.37 | Supported S-NSSAIs per TA. | — | |
| Cell Direction | O | | 9.3.1.78 | | YES | ignore |
| Cell Type | O | | 9.3.1.87 | | YES | ignore |
| Broadcast PLMN Identity Info List | | 0 ... <maxnoofBPLMNs NR-1> | | This IE corresponds to the PLMN-IdentityInfoList IE in SIB1 as specified in TS 38.331 [8]. The PLMN Identities and associated information contained in this IE is provided in the same order as broadcast in SIB1. | YES | ignore |
| >PLMN Identity List | M | | Available PLMN List 9.3.1.65 | | — | |

| IE/Group Name | Presence | Range | IE type and reference | Semantics description | Criticality | Assigned Criticality |
|---|---|---|---|---|---|---|
| >Extended PLMN Identity List | O | | Extended Available PLMN List 9.3.1.76 | | — | |
| >5GS-TAC | O | | OCTET STRING (3) | | — | |
| >NR Cell Identity | M | | BIT STRING (36) | | — | |
| >RANAC | O | | RAN Area Code 9.3.1.57 | | — | |
| Cell-Specific-RACH Config Dedicated | O | | OCTET STRING | RRC Container with the Cell specific Dedicated preamble information to be sent to the UE during connected to inactive transition | YES | ignore |

| Range bound | Explanation |
|---|---|
| maxnoofBPLMNs | Maximum no. of Broadcast PLMN Ids. Value is 6. |
| maxnoofExtendedBPLMNs | Maximum no. of Extended Broadcast PLMN Ids. Value is 6. |
| maxnoofBPLMNsNR-1 | Maximum no. of PLMN Ids.broadcast in an NR cell minus 1. Value is 11. |

According to various, but not necessarily all examples of the disclosure, there is provided a data structure for example, a signal with embedded data as described above, i.e. not least for example an F1/AP: F1 SETUP REQUEST message comprising a Cell-Specific-RACH Config Dedicated IE as described above.

In some examples, the Cell-Specific RACH Dedicated Configuration is provided, in an RRC Container having a RAC H-Config Dedicated IE, during a gNB-DU initiated Configuration Update procedure.

In some examples, the step 602 of FIG. 6 may be performed during task (A).

In task (B), the gNB-CU sends Cell-Specific RACH Dedicated Configuration to the UE during a procedure for transitioning the UE's RRC state to RRC_INACTIVE. This may be provided, e.g. as part of an RRC RELEASE procedure, in which the gNB-CU sends the UE, via the gNB-DU, an RRC RELEASE message 703 with suspend configuration, wherein the RACH-ConfigDedicated IE is part of the suspend configuration of the RRC RELEASE message.

With regards to the RRC release message that is sent, it is proposed that a new "RACH-ConfigDedicated" IE be introduced in the RRCRelease message as indicated in the highlighted "RACH-ConfigDedicated" in the below [based on 3rd Generation Partnership Project; Technical Specification Group Radio Access Network; NR; Radio Resource Control (RRC) protocol specification (Release 15)—3GPP TS 38.331 V15.9.0 (2020-03)]. The following RRCRelease message is just one possible example and the other messages could be used to transmit the configuration information to the UE, not least for example a paging message.

| << excerpt from RRCRelease message (TS 38.331) >> | | | |
|---|---|---|---|
| SuspendConfig ::= | SEQUENCE { | | |
|   fullI-RNTI | I-RNTI-Value, | | |
|   shortI-RNTI | ShortI-RNTI-Value, | | |
|   ran-PagingCycle | PagingCycle, | | |
|   ran-NotificationAreaInfo | RAN-NotificationAreaInfo | OPTIONAL, | --Need M |
|   t380 | PeriodicRNAU-TimerValue | OPTIONAL, | --Need R |
|   nextHopChainingCount | NextHopChainingCount, | | |
|   RACH-ConfigDedicated | RACH-ConfigDedicated | OPTIONAL, | --Need R |
|   ... | | | |
| } | | | |

In some examples, in the case where a UE is performing mobility in an RRC Connected state (referred to herein as "CONNECTED mobility"), a Centralized Unit Control Plane (CU-CP) can receive measurement reports from the UE. Based on these, the CU-CP can decide which cell the UE needs to be handed over to. As part of this decision, the CU-CP can indicate to a target DU (in case of intra-gNB mobility) or to a target gNB-DU (in case of inter-gNB mobility) the dedicate preamble that is to be utilized. By contrast, in the case where a UE is performing mobility in an RRC Inactive state (referred to herein as "INACTIVE mobility), since the CU-CP is unaware of where (i.e. from within which cell) the UE will attempt a state change (from an RRC Inactive state to an RRC Connected state), if the UE is not in same DU, then either at least option (a) or (b) below may be to be considered as a way to handle such a case:

(a) The CU-CP can be in charge of ensuring the same dedicate preamble is not given to multiple UE's. In this option, each DU contacts the CU-CP when establishing an F1 interface and indicates the preambles allowed for dedicated random access procedure for CFRA. The CU-CP then ensures that preambles are not given twice to multiple users (even if they are in completely different locations).

(b) The CFRA procedure is limited to the scenario where the UE attempts the state change in a cell within the same DU. If the UE attempts the state change in a different DU, then the UE would revert to using CBRA (i.e. instead of CFRA). Since the majority of UE's attempt a state change whilst in the same DU (usually 90%+ according to network statistics), option (b) would still provide a benefit despite being limited using CFRA just for the scenario where the UE is in the same DU.

According to various, but not necessarily all examples of the disclosure, there is provided a data structure for example, a signal with embedded data as described above, i.e. not least for example an RRC: RRC RELEASE message comprising a RACH ConfigDedicated IE as described above.

As part of task (B), the gNB-CU may determine whether or not to include the RACH-ConfigDedicated IE as part of the suspend configuration. In other words, the gNB-CU may decide whether or not to enable the UE to have CFRA, i.e. whether or not the UE should be granted high priority access/be deemed a high priority UE (e.g., for emergency service, high priority access, URLLC) as compared to other UE's not granted such CFRA deemed to be low priority.

In this regard, the gNB-CU evaluates whether to provide the UE a dedicated preamble (i.e. provide a RACH-ConfigDedicated IE in the suspend configuration of the RRC RELEASE message), based on whether one or more conditions/criteria are met. Such conditions/criteria can be predetermined and/or configurable by a service operator. Such conditions/criteria may be based, at least in part on one or more of:

a subscription type (e.g., public safety, law enforcement)
a UE type (certain UE model)
a service/slice (e.g., target URLLC, emergency).

This thereby enables the gNB to control whether or not to include the CFRA configuration for various categories of UE's. Various examples of the disclosure, may thereby enable a faster resume process (inactive to connected state transition) for high priority access with the support of contention free preambles. Various examples may also provide flexibility for a network operator to differentiate and configure faster access to e.g. based on the above criteria.

In task (C), the RACH-ConfigDedicated IE of the suspend configuration may be refreshed when the UE performs mobility while in RRC_INACTIVE state. The UE may trigger RNAU procedure, during mobility while in RRC_INACTIVE state using CBRA (instead of CFRA). In this regard, the UE can trigger Inactive Mode procedures actions such as mobility while in RRC_INACTIVE state, which it does so using CBRA (instead of CFRA). CBRA rather than CFRA is used during the RNA update procedure since there is no need for the UE to utilize CFRA as only signaling is incurred (and no actual UE data is transferred). Thus, in these cases, the UE uses CBRA in its sending of its RRC RESUME REQUEST message 704 to the gNB-DU.

It is noted that it is possible that the RNAU procedure is triggered regardless of a UE having remained static and accessing the 5G network via the same cell (since the RNAU procedure may be periodically triggered irrespective of mobile mobility e.g., due to RNA timer expiration).

Whenever an RNA Update procedure takes place, following the performance of the RNAU procedure (including the sending of a RNAU message from the UE to the gNB-DU), the gNB-DU can provide an updated location of the UE to the gNB-CU and information of the current cell/gNB-DU currently servicing the UE. The currently serving gNB-DU may generate configuration information for enabling the UE CFRA, i.e. cell-specific RACH Dedicated Configuration, and it may provide the same to the gNB-CU.

Based on the received updated location of the UE, e.g. being served via a different cell and/or gNB-DU, the gNB-CU may refresh/update the suspend configuration (if needed) with the cell-specific RACH Dedicated Configuration for the new cell reported, and provide the same to the UE in the suspend configuration of the RRC RELEASE message 705. In such a manner the UE receives, from the access node and based at least in part on the performance of the RNAU procedure, cell-specific configuration information that enables the UE to use CFRA with a cell currently serving the UE, i.e. the gNB-DU currently serving the UE, or a cell where the UE is currently located. Such cell-specific configuration information, which enables the UE to use CFRA with a cell currently serving the UE, or a cell where the UE is currently located, can be sent as part of suspend configuration information of an RRC release message.

Again, in determining whether to include the cell-specific RACH Dedicated Configuration in the suspend configuration of the RRC RELEASE message, the gNB-CU may perform the determination as to whether one or more conditions/criteria are met, as per the determination mentioned above in task (B).

In task (D), the UE performs CFRA during RRC_INACTIVE to RRC_CONNECTED state transition to transmit data. The UE utilizes the configured dedicated preamble (of the cell-specific RACH Dedicated Configuration (e.g. the configuration information) in the suspend configuration of the previously received RRC RELEASE message) when it requires to transmit user data. In this regard, upon a determination that the UE requires to transmit user data, and hence needs to transition to RRC_CONNECTED state for the same, the UE sends, to its (current) gNB-DU, an RRC RESUME message 706 using CFRA. The gNB-DU then passes on the message to the gNB-CU.

In task (E), not shown in FIG. 7, the validity of the CFRA resources allocated in the RACH Dedicated Configuration can be timer based. In this regard, CFRA resource allocation or the RACH dedicated Configuration can be restricted to be valid only for the specific period as configured by the gNB. Each of the UE and gNB can release the CFRA allocation in response to determining a condition has been met, such as determining an expiry of a predetermined/configured time period.

For Inter-gNB Inactive State Mobility, the old gNB can release the CFRA resource allocation as part of XnAP: UE CONTEXT RETRIEVE procedure handling.

Figure 8:
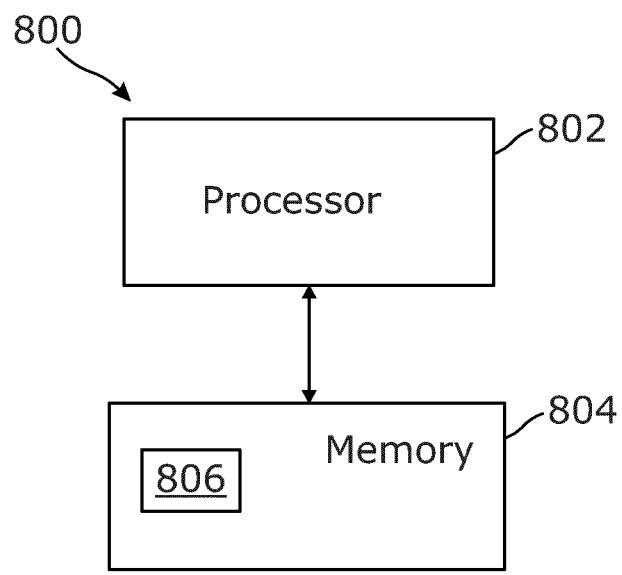
FIG. 8 shows another example of the subject matter described herein.

FIG. 8 illustrates an example of a controller 800 suitable for use in an apparatus—such an apparatus may be for example be: a terminal node (UE) 110, a centralized unit (gNB-CU) 10 and/or a distributed unit (gNB-DU) 20 of an access node (gNB) 120.

Implementation of the controller 800 may be as controller circuitry. The controller 800 may be implemented in hardware alone, have certain aspects in software including firmware alone or can be a combination of hardware and software (including firmware).

As illustrated in FIG. 8 the controller 800 may be implemented using instructions that enable hardware functionality, for example, by using executable instructions of a computer program 806 in a general-purpose or specialpurpose processor 802 that may be stored on a computer readable storage medium (disk, memory etc.) to be executed by such a processor 802.

The processor 802 is configured to read from and write to the memory 804. The processor 802 may also comprise an output interface (not shown) via which data and/or commands are output by the processor 802 and an input interface (not shown) via which data and/or commands are input to the processor 802.

The memory 804 stores a computer program 806 comprising computer program instructions (computer program code) that controls the operation of the apparatus 10, 20, 110 when loaded into the processor 802. The computer program instructions, of the computer program 806, provide the logic and routines that enables the apparatus 110, 10, 20 and/or 120 respectively to perform the methods illustrated in FIGS. 4 to 7. The processor 802 by reading the memory 804 is able to load and execute the computer program 806 thereby providing means for causing the performance of the above described methods, not least such as those illustrated in FIGS. 4 to 7.

Although the memory 804 is illustrated as a single component/circuitry it may be implemented as one or more separate components/circuitry some or all of which may be integrated/removable and/or may provide permanent/semi-permanent/dynamic/cached storage.

Although the processor 802 is illustrated as a single component/circuitry it may be implemented as one or more separate components/circuitry some or all of which may be integrated/removable. The processor 802 may be a single core or multi-core processor.

An example apparatus (i.e. UE 110) according to the present disclosure can therefore comprise:
at least one processor 802; and
at least one memory 804 including computer program code;
the at least one memory 804 and the computer program code configured to, with the at least one processor 802, cause the apparatus at least to perform:
receiving, from an access node, at least one first message for transitioning the UE from an RRC connected state to an RRC inactive state, wherein the at least one message comprises configuration information that enables the UE to use Contention Free Random Access (CFRA); and
sending, using CFRA based at least in part on the configuration information, at least one second message for transitioning the UE from a Radio Resource Control (RRC) inactive state to an RRC connected state.

Another example apparatus (i.e. gNB-CU 10) according to the present disclosure can therefore comprise:
at least one processor 802; and
at least one memory 804 including computer program code;
the at least one memory 804 and the computer program code configured to, with the at least one processor 802, cause the apparatus at least to perform:
receiving, from the distributed unit (gNB-DU), configuration information that enables a UE to use Contention Free Random Access (CFRA); and
causing sending, to the UE, of at least one message for transitioning the UE from a Radio Resource Control (RRC) connected state to an RRC inactive state, wherein the at least one message comprises the configuration information.

Yet another example apparatus (i.e. gNB-DU 20) according to the present disclosure can therefore comprise:
at least one processor 802; and
at least one memory 804 including computer program code;
the at least one memory 804 and the computer program code configured to, with the at least one processor 802, cause the apparatus at least to perform:
sending, to the centralized unit (gNB-CU), configuration information that enables a UE to use Contention Free Random Access (CFRA);
receiving, from the centralized unit (gNB-CU), at least one message for transitioning the UE from a Radio Resource Control (RRC) connected state to an RRC inactive state, wherein the at least one message comprises the configuration information; and
sending the at least one message to the UE.

An example apparatus (i.e. gNB 120) according to the present disclosure can therefore comprise:
at least one processor 802; and
at least one memory 804 including computer program code;
the at least one memory 804 and the computer program code configured to, with the at least one processor 802, cause the apparatus at least to perform:
sending, to a UE, at least one message for transitioning the UE from a Radio Resource Control (RRC) connected state to an RRC inactive state, wherein the at least one message comprises configuration information that enables the UE to use Contention Free Random Access (CFRA).

Figure 9:
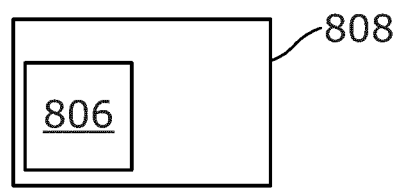
FIG. 9 shows another example of the subject matter described herein.

As illustrated in FIG. 9, the computer program 806 may arrive at the apparatus 110, 10, 20, 120 respectively via any suitable delivery mechanism 808. The delivery mechanism 808 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 806. The delivery mechanism may be a signal configured to reliably transfer the computer program 806. The apparatus 10, 20, 110 may propagate or transmit the computer program 806 as a computer data signal.

In some examples, the computer program instructions 806 are configured for causing an apparatus (i.e. UE 110) to perform at least the following or for performing at least the following:
receiving, from an access node, at least one first message for transitioning the UE from an RRC connected state to an RRC inactive state, wherein the at least one message comprises configuration information that enables the UE to use Contention Free Random Access (CFRA); and
sending, using CFRA based at least in part on the configuration information, at least one second message for transitioning the UE from a Radio Resource Control (RRC) inactive state to an RRC connected state.

In some examples, the computer program instructions 806 are configured for causing an apparatus (i.e. gNB-CU 10) to perform at least the following or for performing at least the following:
receiving, from the distributed unit (gNB-DU), configuration information that enables a UE to use Contention Free Random Access (CFRA); and causing sending, to the UE, of at least one message for transitioning the UE from a Radio Resource Control (RRC) connected state to an RRC inactive state, wherein the at least one message comprises the configuration information.

In some examples, the computer program instructions 806 are configured for causing an apparatus (i.e. gNB-DU 20) to perform at least the following or for performing at least the following:

sending, to the centralized unit (gNB-CU), configuration information that enables a UE to use Contention Free Random Access (CFRA);

receiving, from the centralized unit (gNB-CU), at least one message for transitioning the UE from a Radio Resource Control (RRC) connected state to an RRC inactive state, wherein the at least one message comprises the configuration information; and sending the at least one message to the UE.

In some examples, the computer program instructions 806 are configured for causing an apparatus (i.e. gNB) to perform at least the following or for performing at least the following:

sending, to a UE, at least one message for transitioning the UE from a Radio Resource Control (RRC) connected state to an RRC inactive state, wherein the at least one message comprises configuration information that enables the UE to use Contention Free Random Access (CFRA).

The computer program instructions may be comprised in a computer program, a non-transitory computer readable medium, a computer program product, a machine readable medium. In some but not necessarily all examples, the computer program instructions may be distributed over more than one computer program.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 4 to 7 may represent steps in a method and/or sections of code in the computer program 806 that may be executed by means, such as a processor and memory, to cause the performance or to perform the above described method steps. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

It will be appreciated from the foregoing that, in some examples, there can therefore be provided a UE 110 comprising means for:

receiving, from an access node, at least one first message for transitioning the UE from an RRC connected state to an RRC inactive state, wherein the at least one message comprises configuration information that enables the UE to use Contention Free Random Access (CFRA); and sending, using CFRA based at least in part on the configuration information, at least one second message for transitioning the UE from a Radio Resource Control (RRC) inactive state to an RRC connected state.

It will be appreciated from the foregoing that, in some examples, there can therefore be provided a gNB-CU 10 comprising means for:

receiving, from the distributed unit (gNB-DU), configuration information that enables a UE to use Contention Free Random Access (CFRA); and causing sending, to the UE, of at least one message for transitioning the UE from a Radio Resource Control (RRC) connected state to an RRC inactive state, wherein the at least one message comprises the configuration information.

It will be appreciated from the foregoing that, in some examples, there can therefore be provided a gNB-DU 20 comprising means for:

sending, to the centralized unit (gNB-CU), configuration information that enables a UE to use Contention Free Random Access (CFRA);

receiving, from the centralized unit (gNB-CU), at least one message for transitioning the UE from a Radio Resource Control (RRC) connected state to an RRC inactive state, wherein the at least one message comprises the configuration information; and sending the at least one message to the UE.

It will be appreciated from the foregoing that, in some examples, there can therefore be provided a gNB 120 comprising means for:

sending, to a UE, at least one message for transitioning the UE from a Radio Resource Control (RRC) connected state to an RRC inactive state, wherein the at least one message comprises configuration information that enables the UE to use Contention Free Random Access (CFRA).

In the foregoing description reference has been made to different data structures such as messages, information elements, fields. The messages can be conveyed at different protocol layers such as the RRS layer. It should be appreciated that these data structures are encoded onto information at the Physical layers and conveyed as electromagnetic signals within the network. The data structures are 'control data structures' rather than merely content, because they are used in the control of operations of the network, such as to enable CFRA. The data structures have technical effect.

It is to be appreciated that examples of the present disclosure provide a generic approach that may be applicable to all use cases, including, not least for example: enhanced Mobile Broad Band (eMBB), Ultra Reliable Low Latency Communication (URLLC) and massive Machine Type Communication (mMTC)

The above described examples find application as enabling components of: telecommunication systems; automotive systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above. Although functions have been described with reference to certain features, those functions may be performable by other features whether described or not. Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. A User Equipment (UE) apparatus, comprising:
   at least one processor; and
   at least one memory including computer program code;
   the at least one memory and the computer program code configured to, with the at least one processor, cause the UE apparatus at least to perform:
   receiving, from a centralized unit of an access node, at least one first message for transitioning the UE apparatus from a Radio Resource Control (RRC) connected state to an RRC inactive state, wherein the at least one first message comprises configuration information that enables the UE apparatus to use Contention Free Random Access (CFRA), wherein the access node includes a centralized unit and a distributed unit, and wherein the at least one first message is received from the centralized unit of the access node, wherein the at least one first message is received whilst the UE apparatus is in the RRC connected state, wherein the configuration information is included in:
   a paging message,
   an RRC message,
   an RRC release message,
   an RRC release message for transitioning the UE apparatus from an RRC connected state to an RRC inactive state, and suspend configuration information of an RRC release message, wherein the configuration information comprises a random access channel (RACH)-ConfigDedicated information element identifying one or more dedicated random access preambles allocated to the UE apparatus for contention free random access, wherein the configuration information is not responsive to a paging message or measurement configuration, wherein the dedicated random access preambles are specific to a cell of a distributed unit (DU) of a network node and are valid only for a configured time duration, wherein the cell is identified by the centralized unit, wherein the network node is different from the access node, and wherein the configuration information is indicative of:
a CFRA allocation,
one or more dedicated resource for the UE apparatus to perform uplink access,
one or more configured dedicated preambles, and
one or more cell specific RACH dedicated configuration preambles;

sending, using CFRA, based at least in part on the configuration information, at least one second message for transitioning the UE apparatus from a RRC inactive state to an RRC connected state;

initiating an RRC resume procedure, wherein the at least one second message is at least one message of the RRC resume procedure; and releasing the CFRA allocation in response to determining a condition being met.

* * * * *